Patented Dec. 2, 1952

2,620,319

UNITED STATES PATENT OFFICE 2,620,319

SURFACE COVERING SHEET AND METHOD OF MAKING THE SAME

William Rowe, Lewiston, and Samuel A. Cohen, Auburn, Maine, assignors to Bonafide Mills, Inc., Lisbon, Maine, a corporation of Maine No Drawing. Application June 3, 1950, Serial No. 166,978

8 Claims. (Cl. 260—19)

This invention relates to a surface covering sheet and to a method of making the same.

One object of the invention is to produce a novel surface covering sheet which may be used with advantage as a covering for the surfaces of floors, walls, stairs, furniture tops, counters, or the flooring in public conveyances such as buses, railroad cars and in ships, and in general for all of the purposes for which linoleum, tiles, and other commercial forms of floor and wall coverings have or may be used, and which is characterized particularly by superior resistance to alkali, soap, household greases, oils, solvents and also to burning and staining due to cigarettes, thus enabling the surface covering to be advantageously used over all kinds of surfaces including over concrete floors, on grade, below grade and above grade, and also over floors that yield, such as wood and plywood. The present surface covering is capable of withstanding wide variations in temperature, is highly resistant to wear, and can be produced in either plain or decorative form.

A further object of the invention is to provide a novel binder for use in the production of surface covering sheets of the character described and which possesses characteristics which make it particularly suitable for such purposes and enable it to be produced economically in a practical and simple manner.

A still further object of the invention is to provide a novel method of producing the present improved binder and surface covering sheet.

With these general objects in view and such others as may hereinafter appear, the invention consists in the surface covering sheet, in the binder for producing the same, and in the methods of making the binder and surface covering sheet hereinafter described and particularly defined in the claims at the end of this specification.

One of the principal uses of the present surface covering sheet is as a floor covering or tile for application to floors, walls, and other surfaces. At the present time linoleum compositions are extensively used for such purposes and comprise in general an intimate mixture of a cement or binder and finely divided fillers. The fillers usually employed comprise cork, wood flour, together with various types of organic or inorganic pigments and extenders such as calcium carbonate, gypsum and the like. The linoleum cement or binder comprises in general a siccative oil-resin gel cement containing a thickened or bodied drying or semi-drying oil referred to as a siccative oil and a resin. The bodying or thickening is accomplished by polymerization induced by heat, by an oxidation process, or by both heat and oxidation. The resins which have been usually employed in the formation of the siccative oil-resin gel having included natural resins, synthetic resins, or combinations thereof, including rosin, ester gum, kauri gum, copal, alkyd resin, rosin modified phenol-aldehyde resin, and the like, or mixtures thereof. In practice rosin is most widely used as the resin, and in practice the linoleum cements have comprised from 65 to 85% by weight of siccative oil and about 15 to 35% by weight of resin, and the oils employed have usually comprised linseed oil, soya bean oil, menhaden oil, Perilla oil, rapeseed oil, China-wood oil, and mixtures thereof. The acid numbers of the linoleum cements or binders are usually quite high, ranging from 30 to 100. The usual processes by which these materials are produced involve air blowing for relatively long periods of time resulting in extensive oxidation and the formation of oxy acids which contribute to the relatively high acidity of the materials.

After the production of the linoleum composition prepared by admixing the siccative oil-resin gel cement with fillers such as cork, wood flour, and the like, together with color pigments, the product is applied upon a backing of burlap, cotton cloth or asphalt saturated felt, and then transferred to an oven where heat is applied for a number of days in order to effect final curing of the linoleum.

Experience has demonstrated, and it has been generally recognized, that linoleum lacks resistance to grease, oil, strong soaps or alkalies because of the saponifiable nature of the free fatty acids in the linoleum. Its use over concrete floors is generally restricted to locations above grade, and experience has demonstrated that linoleum soon disintegrates when applied on grade or below grade over concrete floors because of the action of alkali which is brought to the surface with water due to hydrostatic pressure.

Another commercial form of surface covering with respect to which the present surface covering possesses superior utility comprises the mastic floor tiles now upon the market. Such tiles usually consist of a binding agent of the coumaroneindene resin type, with pitches, castor oil gels, or other known types of plasticizers. Fillers usually of asbestos fiber, ground limestone, and various pigments are used to impart the desired colorations. The finished tile, however, does not have as good a marbelized appearance as linoleum and is difficult to keep clean due to its porosity, is quite noisy when walked on, and is very susceptible to the action of solvents. Although usually highly loaded with filler, the flooring is thermoplastic in nature and is susceptible to temperature changes, and because of its brittle nature is not recommended for use over yieldable floors such as wood floors. In addition to the foregoing, vinyl floorings have been manufactured and sold in limited quantities. Such floorings usually consist of a binder containing poly-vinyl chloride, plasticized with known plasticizers such as dioctyl phthalate, di-butoxy ethyl phthalate, and tricresyl phosphate. The fillers usually have included calcium carbonate, asbestine, various color pigments and agents for imparting light and heat resistance. In order for these vinyl floorings to be competitive, it is necessary to produce a much thinner commercial product than the competitive linoleum or asphalt tile because of the cost of the binders employed therein. The thin film vinyl floorings are easily scuffed and scratched and also indent quite easily.

The present invention contemplates the production of a surface covering sheet which may be manufactured and marketed in competition with any of the foregoing floor covering products now upon the market, and which possesses properties which render its use for universal purposes practicable. For example, the present floor covering can be successfully utilized for grade or below grade installations over concrete as well as installations above grade and may be satisfactorily laid over wood, plywood, and other floors. The surface covering is highly resistant to the action of alkalies, soaps, household greases, oils and solvents and is able to efficiently withstand traffic without exhibiting undue wear. The surface covering is also able to withstand variations in temperatures over a wide range so that the flooring can be laid in stores and in industrial areas, particularly under conditions where resistance to wear is of primary importance. Inasmuch as the binder is neutral, the flooring is useful in establishments such as breweries, wineries, dairies, and as the flooring in public conveyances such as buses, railroad cars and in ships.

In general, the invention contemplates the production of a composition sheet and particularly a composition fibrous sheet in which the composition layer may be applied in any usual or preferred manner to a felt, fibrous or other backing sheet, and comprises either the thermal reaction product of one or more fatty acids, or siccative oils or combinations thereof, one or more resins of the types to be hereinafter referred to, and which may comprise one or more phenol-formaldehyde resins, and one or more polyhydric alcohols, or a product produced by incorporating an oil-soluble resin into the fatty acids, or siccative oils or combinations thereof, and the acid number is controlled by the addition of a polyhydric alcohol in a sufficient amount to impart an acid number of 10 or less. The processing is carried to the point where the binder has a relatively low acid number. The binder is treated to impart to it the desired viscosity or body and suitable pigments and fillers may and preferably will be embodied therein to impart the desired color and marbelized effect much as is now the practice in the production of good grades of linoleum.

For purposes of illustration the following examples are given and the process is illustrated in connection therewith for the production of a floor covering capable of use for all of the purposes for which linoleum may be used and which as above described may be used in many instances where at present linoleum cannot be used with advantage.

EXAMPLE 1

|  | Pounds |
|---|---|
| Tall oil or tall pitch | 700 |
| 100% Phenol-formaldehyde resin (heat-reactive, oil-soluble) | 105 |
| Pentaerythritol | 84 |
|  | 889 |

The tall oil is heated to the neighborhood of 350° to 400° F. and then a heat-reactive phenol-formaldehyde resin is introduced and the temperature held at approximately 400° F. until the reaction is completed. The temperature is then gradually raised and pentaerythritol is slowly introduced and the heat gradually raised to the neighborhood of 575° F. and held there until an acid value of less than 10 is obtained. The tall oil ester formed by the preceding treatment of the tall oil is semi-hard when cold and when heated above 150° F. becomes quite fluid. This product is combined with a siccative oil and then treated to form a gel or cement of the general viscosity of the usual linoleum siccative oil-resin gel cement commonly used in the production of linoleum except that the gel thus produced possesses a low acid number usually less than 5. This tall oil or tall pitch ester which contains phenol-formaldehyde resin to improve its alkali resistance is then treated in the following manner:

|  | Pounds |
|---|---|
| Tall oil ester or tall pitch ester | 65 |
| China-wood oil-soya bean oil copolymer | 35 |
| Litharge | 0.5 |
|  | 100.5 |

For this purpose a siccative oil such as China-wood oil, soya bean oil alone, linseed, safflower, fish oil, soya bean oil which has been reacted with maleic anhydride, a copolymer oil of linseed oil and dicyclopentadiene or fish oil copolymerized with dicyclopentadiene, dehydrated castor oil, perilla oil, hempseed oil, citicica oil, sunflower, walnut, soya, or other semi or drying oils or combinations thereof. The tall pitch ester blend or tall oil ester blend is preferably subjected to oxidation by air blowing in an oxidizer of any usual or preferred type such as is now used in the production of linoleum and which may comprise a modified Bedford type of oxidizer, the oxidation being carried on at a moderately elevated temperature at from 150 to 220° F. until a cementitious gel is produced. The action is one of both oxidation and polymerization. Probably the rapid rise in viscosity which takes place upon heating and blowing is primarily due to polymerization with some oxidation.

After the preparation of this cementitious gel, fillers such as ground limestone, precipitated calcium carbonate, gypsum, barytes, asbestos, glass wool, mineral wool, diatamaceous earth, carborundum, or alundum, ground slate flour, together with organic fillers if desired including a minor percentage of ground or shredded wood, ground cork, sawdust, leather dust, shredded rag or paper fibers may be embodied therein. The final composition which is merely typical and can be varied considerably is indicated below:

|  | Pounds |
|---|---|
| Cement | 240 |
| Mixed asbestos fiber | 250 |
| Ground limestone | 385 |
| Titanium dioxide | 55 |
| Colored pigments | 10 |
| Zinc oxide | 0.25 |
|  | 940.25 |

The desired color effects may be secured by incorporating into the compositions pigments that are resistant to soap and alkali. A few examples of the white pigments which may be utilized include titanium dioxide, antimony oxide, zinc oxide, lithopone, zinc sulfide and titanium extended pigments. Among the dry colors which may be used may be mentioned the natural and synthetic iron oxides, umbers, ochres, chrome oxide, chrome hydrate, copper phthalocyanine blues and greens, indanthrene blues, toluidine reds, benzidene yellow, hansa yellow, cadmium red and yellows, ultramarine blue, black pigments, tunstated and molybdated pigments and numerous other dry colors.

Where alkali and soap resistance are not of paramount importance, other dry colors such as chrome orange, molybdate orange, zinc yellow, iron blues, chrome greens, lithol reds, lithol rubine and other dry colors may be used. It is also possible to use combinations of the dry colors of the two types mentioned above.

The composition is sheeted and marbelized and pressed on burlap, cotton cloth or saturated felt in the regular manner. A stoving period of approximately five to twenty days at 150–220° F. is applied depending upon the thickness of the product in order to finally cure the product.

While it is preferred to utilize crude or refined tall oil in the production of the present binder composition, nevertheless other sources of fatty acids or siccative oils may be used in accordance with the broader aspects of the invention. For example, tall oil pitch, cotton seed pitch, soya bean pitch or linseed pitch, linseed oil, Chinawood oil, fish oil, soya bean oil or their fatty acids, or the fatty acids produced by the fractional distillation of oils such as tall oil may be utilized either alone or in combination with tall oil or tall oil pitch. Tall oil contains only a few percent of saturated acids, mainly palmitic. The unsaturated acids appear to be mostly a mixture of about equal parts of oleic and linoleic acids. Part of the linoleic acid is in the conjugated form. There is little, if any, linolenic acid. The rosin acids in tall oil are somewhat similar to abietic acid. The tall oil can vary in fatty acid to rosin acid proportions within the range of 1 part fatty acid to 3 parts rosin acids to from 3 parts fatty acids to 1 part rosin acid. We can also combine other fatty acids with rosin in the same proportions. The fatty acids may include: lauric, myristic, stearic, oleic, ricinoleic, linoleic, linolenic, licanic, elaeostearic, cluponadonic, which are derived from well known common drying oils or the fatty acids defined as $C_9$ to $C_{24}$ acids.

The presence of unsaturated fatty acids is detected in a readiest manner by determining the iodine value of the mixed fatty acids. This method furnishes a measure of the unsaturated fatty acids much as the iodine value of the oils and fats affords a measure of the unsaturated glycerides. For example, the drying oils will have an iodine value of approximately 150–200, and the semi-drying oils have iodine values of approximately 120–150, and the non-drying oils as a rule below 100. In our process, we use the drying oils or combinations of drying and semi-drying oils within the range of iodine values of from 100 to 200, and preferably within the range of from 130 to 200.

The phenol-formaldehyde condensation products or resins which are reacted as above described with the mixture of rosin acids and fatty acids may be of the heat-reactive, oil-soluble type or they may be of the non-heat-reactive, oil-soluble type.

The following examples are given of typical phenol-formaldehyde resins of both types together with a brief description of methods of making the same:

*Heat-reactive, oil soluble phenol-formaldehyde resins*

EXAMPLE 1

100 parts p-tert-butyl phenol.

85 parts commercial 40% formaldehyde solution left in contact in presence of 15 parts of 15% caustic soda solution taking care that the temperature does not rise above 60° C. in order to avoid a considerable loss of formaldehyde. The phenol body dissolves or melts to form a clear solution with the other ingredients. The alkaline solution is maintained at 40° C. for one week, and by neutralizing the same with any acidic substance the oily reaction product is precipitated. After separation from the aqueous liquid it is heated about two hours at 100° C. and then at about 135° and is kept at the latter temperature for ½ hour. The resultant product is heat reactive and oil soluble.

EXAMPLE 2

50 parts C. P. p-benzyl phenol of a melting point of 84° C.

30 parts commercial formaldehyde solution.

4 parts Na OH, or equivalent, are left in contact about 3 days until chemical combination has taken place. By neutralization or acidification a liquid condensation product is obtained which may be converted into the solid resinate stages through further condensation. Heat-reactive, oil-soluble.

EXAMPLE 3

75 grams p-tert-butyl phenol are condensed for several hours at 100° C. with 50 grams of 30% formaldehyde, and 7.5 grams concentrated ammonia until a clear viscous resin has been formed which can be easily separated. It is a pale lemon yellow color and oil soluble in all proportions until fused when insoluble. Heat-reactive.

EXAMPLE 4

100 parts p-tert-amyl phenol.

85 parts commercial 40% formaldehyde solution left in contact in presence of 15 parts of 15% caustic soda solution taking care that the temperature does not rise above 60° C. in order to avoid a considerable loss of formaldehyde. The phenol body dissolves or melts to form a clear solution with the other ingredients. The alkaline solution is maintained at 40° C. for one week, and by neutralizing the same with any acidic substance the oily reaction product is precipitated. After separation from the aqueous liquid it is heated about 2 hours at 100° C. and then at about 135° C. and is kept at the latter temperature for ½ hour. The resultant product is heat reactive and oil soluble.

EXAMPLE 5

50 parts p-cyclo-hexyl phenol.

30 parts commercial formaldehyde solution.

4 parts Na OH, or equivalent, are left in contact about 3 days after which time a chemical combination has taken place. By neutralization or acidification a liquid condensation product is obtained which may be converted into solid resinate stages through further condensation. Heat-reactive, oil-soluble.

EXAMPLE 6

75 parts of phenol and 180 parts of para-tert-butyl phenol are added to 330 parts of 37% formalin. Five parts of sodium hydroxide in 10 parts of water are added, and the mixture is heated gradually to 75° C. The mixture is stirred for six hours at this temperature and then cooled to ordinary temperature whereupon a small amount of hydrochloric acid is added to neutralize the caustic soda. The resin is then allowed to separate and the water layer drawn off.

EXAMPLE 7

97 parts of a commercial meta-para-cresol mixture (containing 40% para-cresol, 60% meta-cresol, and not more than about 5% ortho-cresol) and 15 parts of para-tert-butyl phenol are mixed with 150 parts of 37% formalin. Two parts of sodium hydroxide in 4 parts of water are added and the mixture is heated to 60° C. and is agitated at this temperature for six hours. Thereafter the mixture is cooled to room temperature, neutralized, and the resin is separated from the water.

EXAMPLE 8

A mixture containing 50 mole percent of phenol and 50 mole percent of para-butyl phenol with 2 moles of formaldehyde in aqueous solution for each mole of phenol (based on the average molecular weight) is heated for four hours at 70° C. at pH of 9 with stirring. Thereupon the mixture is cooled, neutralized, and the resin separated from the water.

EXAMPLE 9

A mixture containing 50 mole percent of meta-cresol and 50 mole percent of para-cresol with enough formalin so that there are two moles of formaldehyde for each mole of cresol and 4% by weight of a 20% solution of sodium hydroxide is reacted for six hours at 60° C. The product is cooled, neutralized, and the resin is separated from the water.

*Non-heat-reactive, oil-soluble phenol-formaldehyde resins*

EXAMPLE 1

100 parts p-tert-butyl phenol.

45 parts 40% formaldehyde solution left in contact in the presence of 1-3% of sulphuric acid. The acid is prepared by mixing 20 volumes of acid with Specific Gravity of 1.84 with 80 volumes of water. The temperature of the reaction is controlled between 60°-80° C. After the reaction is completed remove water mixture neutralized by milk of lime and the remaining water is removed by vacuum.

EXAMPLE 2

75 parts p-tert-amyl phenol.
45 parts 30% formaldehyde solution.
2-6 parts H₂SO₄. The procedure for diluting the acid and preparation of the resin is carried out as indicated in Example 1.

EXAMPLE 3

50 parts C. P. p-benzyl phenol M. P. 84° C.
25 parts 30% formaldehyde solution.
2-6 parts H₂SO₄. The procedure for diluting the acid and prepaartion of the resin is carried out as indicated in Example 1.

EXAMPLE 4

A mixture containing 1 mole of para-substituted phenol or homologues and 0.8 mole formaldehyde in aqueous solution and 0.008 mole HCl (calculated as HCl gas) are heated from 40°-100° C. until the reaction is completed. Thereupon the mixture is cooled, neutralized, and the resin separated from the water.

*In general.*—The heat-reactive, oil-soluble phenol-formaldehyde resin is made by reacting 1 mole of phenol and 1½ moles of formaldehyde in the presence of caustic soda or alkaline catalyst. P-phenyl phenol, p-tert amyl phenol and p-tert butylphenol are preferred because of their properties, availability and purity. A number of others, octyl-phenol, isobutyl phenol, cyclohexyl phenol, to mention a few, may be used.

The heat-reactive resins can also be made from a mixture of one or more para-substituted phenols with one or more other phenols having more than two unsubstituted reactive positions in the molecule.

Any source of formaldehyde such as formalin, paraform, hexamethylene tetramine, etc., may be used.

The non-reactive resins employ the same type of phenols; however, they are usually made with an acid catalyst, one mole of phenol to approximately 0.9 mole formaldehyde. Proportions can be changed as well as the catalyst.

Various polyhydric alcohols may be used including glycerine, di-ethylene glycol, polyethylene glycol, propylene glycol, ethylene glycol, pentaerythritol, di-pentaerythritol, poly-pentaerythritol, mannitol, sorbitol, allyl alcohol, erythritol and any other of the commercially available glycols can be used for producing the cementitious gel. Some non-drying oils, such as castor oil, can be used to control flexibility if it is so desired. Accelerating agents to hasten cure, such as the lead, manganese and cobalt napthenate type driers, zinc oxide, lime, etc., may be added.

For purposes of illustration the following examples are given of various formulae for producing the fatty acid resin esters used in producing the present covering sheets.

| | |
|---|---|
| 1. Tall pitch | 700 lbs. |
| Phenol-formaldehyde resin | 25-150 lbs. |
| Pentaerythritol or other polyhydric alcohols. | Sufficient quantity for acid number less than 10. |
| 2. Tall oil | 700 lbs. |
| Phenol-formaldehyde resin | 25-150 lbs. |
| Pentaerythritol or other polyhydric alcohols. | Sufficient quantity for acid number less than 10. |
| 3. Tall oil | 500 lbs. |
| Cottonseed pitch | 200 lbs. |
| Phenol-formaldehyde resin | 25-150 lbs. |
| Di-ethylene glycol or other polyhydric alcohols. | Sufficient quantity for acid number less than 10. |
| 4. Tall pitch | 500 lbs. |
| Soya pitch | 200 lbs. |
| Phenol-formaldehyde resin | 25-150 lbs. |
| Glycerine or other polyhydric alcohols. | Sufficient quantity for acid number less than 10. |
| 5. Tall oil | 400 lbs. |
| Linseed pitch | 300 lbs. |
| Phenol-formaldehyde resin | 25-150 lbs. |
| Pentaerythritol or other polyhydric alcohols. | Sufficient quantity for acid number less than 10. |

While the specific composition illustrated in Example 1 has been found to be satisfactory in producing a commercial form of the present covering sheet, the foregoing are other examples of formulations which have also been found to be satisfactory in order to produce the oil resin ester.

For producing the cementitious gel from the oil resin ester, the following formulations have been found to be satisfactory, it being understood that the compositions are air blown until the desired gel formation is produced.

| | Pounds |
|---|---|
| 1. Tall pitch ester | 50 –90 |
| China-soya copolymer | 50 –10 |
| Litharge | 0.5 – 1.0 |
| 2. Tall oil ester | 40 –70 |
| China-soya copolymer | 60 –30 |
| Litharge | 0.5 – 1.0 |
| 3. Tall pitch ester | 50 –70 |
| Cottonseed pitch | 30 –20 |
| Linseed oil | 20 –10 |
| Litharge | 0.5 – 1.0 |
| 4. Tall oil ester | 40 –60 |
| Soya pitch | 30 –20 |
| Soya bean oil | 30 –20 |
| Manganese Resinate (6% MN) | .01– .03 |
| Litharge | 0.5 – 0.2 |
| 5. Tall pitch ester | 50 –70 |
| Linseed pitch | 20 –10 |
| Dehydrated castor oil | 30 –20 |
| Manganese resinate | 0.01– .03 |
| Lead Napthenate (24% pb) | 2.0 – 0.8 |
| 6. Tall oil ester | 40 –70 |
| Linseed pitch | 40 –20 |
| Maleic treated soya bean oil | 20 –10 |

The preferred range is from 1 part of siccative oil to ⅔ part ester to 1 part siccative oil to 9 parts of ester by weight.

For producing the covering sheet suitable fillers and pigments are incorporated in cementitious gel and the following indicate ranges of fillers and pigments which have been found to be most suitable for producing satisfactory floor coverings for use for all of the purposes for which linoleum and commercial forms of tile are now used.

| | Pounds |
|---|---|
| 1. Cement or binder | 200–300 |
| Fiber inorganic | 150–300 |
| Filler | 500–300 |
| White pigments and colored pigments to suit. | |

| | Pounds |
|---|---|
| 2. Cement or binder | 200–300 |
| Fiber inorganic | 100–200 |
| Fiber organic | 50–100 |
| Filler | 500–300 |
| White pigments and colored pigments to suit. | |

The following examples are given for illustrative purposes of other materials useful for the prepartion of the cementitious gel, as above pointed out, involving the incorporation of an oil-soluble resin into fatty acids, or siccative oils, or combinations thereof and to which sufficient polyhydric alcohol is added to impart an acid number of 10 or less.

EXAMPLE 1

| | Pounds |
|---|---|
| Tall oil pitch | 700 |
| Coumarone-indene resin | 75–150 |
| Polyhydric alcohol in sufficient amount to impart an acid number less than 10 | |

This tall oil pitch ester may then be blended with a siccative oil in accordance with the operations above described in the following proportions:

EXAMPLE 2

| | Pounds |
|---|---|
| Tall oil pitch ester | 45 –85 |
| Siccative oil | 55 –15 |
| Litharge | 0.5– 1.0 |

Instead of tall oil pitch, tall oil may be used, and the following illustrate the formulation which is preferred:

EXAMPLE 3

| | Pounds |
|---|---|
| Tall oil | 700 |
| Coumarone-indene resin | 75–150 |
| Polyhydric alcohol in sufficient amount to impart an acid number of less than 10 | |

The foregoing is blended with a siccative oil in accordance with the following:

EXAMPLE 4

| | Pounds |
|---|---|
| Tall oil ester | 40 –70 |
| Siccative oil | 60 –30 |
| Litharge | 0.5– 1.0 |

In place of courmarone resins the other resins herein enumerated may be used including the run copals, the copal types of synthetic resins and alkyd resins, and it will also be understood that the proportions of resin to fatty acid may be widely varied in accordance with the purposes for which the product is to be used.

While it is preferred and usually necessary to utilize a polyhydric alcohol to reduce the acidity of the composition, nevertheless, in some instances the acidity may be controlled by proper control of the polymerization, making the use of a polyhydric alcohol unnecessary. In practice it is preferred to reduce the acid number to from 2 to 5.

While it is preferred to prepare the cementitious gel by combining a siccative oil, with either the thermal reaction product of one or more fatty acids or siccative oils or combinations thereof, one or more resins of the type herein referred to and one or more polyhydric alcohols or with a product produced by incorporating an oil-soluble resin into the fatty acids, or siccative oils or combinations thereof and to which sufficient polyhydric alcohol is added to impart an acid number of 10 or less, we desire to point out that this cementitious gel can also be produced in other ways, for example, mixture of rosin acids and fatty acids such as in tall oil may be combined with a phenol-formaldehyde resin and esterification with a polyhydric alcohol may be completed and the siccative oil may be introduced into the kettle and heat polymerization continued until a cementitious gel of the desired characteristics is formed. In other words, the step of air blowing may be omitted and except for the fact that substantially more time is required to effect the formation of a gel of the desired characteristics, such a process is entirely practical. If desired, the siccative oil can also be introduced into the kettle at the start of esterification along with the phenol-formaldehyde resin and the polyhydric alcohol. Of course, if desired, air can be introduced so that oxidation may take place along with the heat polymerization.

As additional modifications of the present binder, we may include along with the foregoing a synthetic or natural resin. For example, coumarone-indene resins, East India resins, run copals or other fossil resins, such as kauri, pontianak and boea, copal type synthetic resins, rosin modified maleic resins, ester gum and other rosin esters together with the alkyd resins including the drying oil modified type, the urea modified type, the natural resin modified type, the phenol modified type and the phenol modified and oil extended type.

Resins obtained by polymerizing oils which have been cracked at high temperatures may be used with the phenolformaldehyde or other resin. These resins are heat-reactive aromatic type of olefinic hydrocarbon polymers obtained from petroleum. Other petroleum resins made with dicyclopentadiene consisting of polymerized di-olefins and which are unsaturated may be used. Drying oils that have been copolymerized with styrene, substituted styrene, or cyclopentadiene may be used.

The phenol-formaldehyde resins may also be replaced entirely or partially with Petrex resins. Petrex acid is a synthetic resinous polybasic acid of terpene origin and is used in the manufacture of heat-setting alkyd resins. Another resin which may replace the phenolic resin partially or entirely is the synthetic resin whose fundamental ingredient is carbic anhydride. The carbin anhydride is produced by the reaction of cyclopentadiene and maleic anhydride. This adduct is in turn reacted with a polyhydric alcohol and a fatty acid to form the carbic resin. Resins of these types are heat reactive or oil reactive and oil soluble.

It will be observed from the foregoing that in accordance with the present invention the tall oil or equivalent source of rosin-fatty acid may be heated with a phenol-formaldehyde or equivalent resin, the temperatures being maintained in the range of from 300° F. to 450° F. and preferably in the neighborhood of 350° to 400° F. until the reaction is completed. Condensation appears to take place with the formation of water accompanied by substantial foaming. As soon as the reaction has been completed, and the foaming subsides, the temperature is gradually raised, and at the same time the polyhydric alcohol, such as pentaerythritol, is added, preferably in a small stream. As soon as the pentaerythritol is added, the esterification process begins, accompanied by the evolution of water, and here again substantial foaming takes place. The temperature is preferably gradually raised to within the range of from 400° to 575° F., and preferably between 400° to 500° F., and the mass is held at this temperature until the desired acid number, for instance less than 10, and the desired viscosity are obtained.

The exact mechanisms of the various reactions which take place are not well understood, but it is believed that the phenol-formaldehyde resin upon heating condenses and combines with the olefinic acids and the resinous acids of the tall oil or equivalent. Apparently a bond is formed at the unsaturated groups of the resin acids or fatty acids. Viewed in another way, it is thought that reaction may occur between the hydroxy groups of the phenol-formaldehyde resin and the double bonds of the tall oil or equivalent resinous acids (similar to abietic acids) and the fatty acids. Another reaction may occur between the phenol-formaldehyde resin and particularly to hydroxy group thereof and the tall oil resin acids yielding oil-soluble esters, and while the foregoing is believed to be the correct theory of the reactions, a third possibility exists comprising the reaction of the resin acid groups of the tall oil resin acids and the hydroxy groups of the phenol-formaldehyde resins. Upon introduction of the polyhydric alcohol into the heated mass, reaction takes place between the acidic products of the preliminary reactions between the polyhydric alcohol and the constituents of the tall oil to form esters.

In the production of the present cementitious gel, the phenol-formaldehyde resin appears to speed up the polymerization, and this is desirable for the reason that more highly polymerized oil products are generally known to be more stable chemically and are able to resist the action of alkali and other acids and other comparable products which have not been highly polymerized.

When air blowing is utilized in the production of the gel, it has been found that the usual time heretofore required of from 12 to 24 hours at 180 to 200° F. may be reduced to approximately 2 to 4 hours, resulting in the formation of a minimum amount of oxy-acids.

This is desirable as binders requiring a higher degree of oxidation result in a higher acid content due to the formation of oxy-acids and consequently poorer resistance to alkali and other chemicals. In other words in our process we desire to produce a binder primarily by polymerization where oxidation plays a minor role. We could, of course, heat polymerize the vehicle entirely until the mass forms a complete gel. We have found, however, that the more desirable binder is one in which the tall oil ester is blended with a siccative oil and air blown in an oxidizer. When the binder is withdrawn from the oxidizer it is permitted to cool in pans. The binder is several inches thick, and a thin oxidized or polymerized film is formed on the surface permitting easier handling. The binder is cut up into pieces, and the skin formed on the surface assists in keeping these pieces from sticking together. The presence of a phenol-formaldehyde resin also improves the alkali resistance, and when a reactive resin is heated with ester gum, forms higher melting points comparable to modified phenol-formaldehyde resins. As the tall oil contains rosin acids it is believed that this same function occurs when a polyhydric alcohol and phenol-formaldehyde resin are combined with tall oil. The phenol-formaldehyde resins are also used with drying oils where they condense further on heating. The fatty acids in tall oil may be considered drying oils, especially when a polyhydric alcohol is used to esterify these fatty oil acids. Although we have considered the presence of a phenol-formaldehyde resin important in obtaining improved alkali resistance, resistance to other chemicals, grease, and oil may be achieved without it.

The final gel is practically insoluble in mineral spirits (boiling range 300° F. to 400° F. kauri-butanol value 37–40, flash point 105° F., specific gravity 0.8035) and other usual petroleum solvents. The resin-acid-alcohol cook is only partially soluble in this solvent. It is our intention to get the vehicle as insoluble in usual petroleum thinners as possible in contrast to the usual varnish-making procedure where solubility is of paramount importance. It is difficult to obtain the exact percentage.

The material may and preferably will be processed to the point where it possesses the ability to more efficiently resist indentations due to the pressure or weight of chairs, desks, and other furniture, as well as the action of women's shoe heels and of the wheels of small trucks and other light trucking conveyances.

This application is a continuation-in-part of our application Serial No. 88,902, filed April 21, 1949, which has been abandoned in favor of this application.

Having thus described the invention, what is claimed is:

1. The process of making a binder for use in producing a covering sheet for floors, walls and other surfaces, which comprises, reacting a mixture of rosin acids and fatty acids in which the ratio of fatty acids to rosin acids is between 1 to 3 and 3 to 1 with a heat-reactive, oil-soluble phenol-formaldehyde condensation product in an amount ranging between approximately 1 part and 6 parts by weight to 28 parts of the mixture of rosin and fatty acids at a temperature of from 300° to 450° F. until condensation is substantially complete to produce a resin mixture, adding a polyhydric alcohol to said resin mixture in an amount sufficient to reduce the acid number of the resulting material to a value less than 10, reacting said alcohol with said resin mixture at a temperature between approximately 400 and 575° F. to produce a viscous ester, incorporating a siccative oil into said ester in an amount between 1 part of siccative oil to 2/3 part ester and 1 part siccative oil to 9 parts ester by weight and bodying the resulting mixture to a cementitious gel resistant to solvents, grease, oil, acids and alkalies.

2. The process of making a binder for use in producing a covering sheet for floors, walls and other surfaces, which comprises, reacting a mixture of rosin acids and fatty acids in which the ratio of fatty acids to rosin acids is between 1 to 3 and 3 to 1 with an oil-soluble phenol-formaldehyde condensation product in an amount ranging between approximately 1 part and 6 parts by weight to 28 parts of the mixture of rosin and fatty acids at a temperature of from 300° F. to 450° F. until condensation is substantially complete to produce a resin mixture, adding a polyhydric alcohol to said resin mixture in an amount sufficient to reduce the acid number of the resulting material to a value less than 10, reacting said alcohol with said resin mixture at a temperature between approximately 400 and 575° F. to produce a viscous ester, incorporating a siccative oil into said ester in an amount between 1 part of siccative oil to 2/3 part ester and 1 part siccative oil to 9 parts ester by weight and bodying the resulting mixture to a cementitious gel resistant to solvent, grease, oil, acids and alkalies.

3. The process of making a binder for use in producing a covering sheet for floors, walls and other surfaces, which comprises, reacting a material selected from the group consisting of tall oil and tall oil pitch with a heat-reactive, oil-soluble phenol-formaldehyde condensation product in an amount ranging between approximately 1 part and 6 parts by weight to 28 parts of said material at a temperature of from 300° F. to 450° F. until condensation is substantially complete to produce a resin mixture, adding a polyhydric alcohol to said resin mixture in an amount sufficient to reduce the acid number of the resulting material to a value less than 10, reacting said alcohol with said resin mixture at a temperature between approximately 400 and 575° F. to produce a viscous ester, incorporating a siccative oil into said ester in an amount between 1 part of siccative oil to 2/3 part ester and 1 part siccative oil to 9 parts ester by weight, and bodying the resulting mixture to a cementitious gel resistant to solvents, grease, oil, acids and alkalies.

4. The process of making a binder for use in producing a covering sheet for floors, walls and other surfaces, which comprises, reacting a material selected from the group consisting of tall oil and tall oil pitch with an oil-soluble phenol-formaldehyde condensation product in an amount ranging between approximately 1 part and 6 parts by weight to 28 parts of said material at a temperature of from 300° F. to 450° F. until condensation is substantially complete to produce a resin mixture, adding a polyhydric alcohol to said resin mixture in an amount sufficient to reduce the acid number of the resulting material to a value less than 10, reacting said alcohol with said resin mixture at a temperature between approximately 400 and 575° F. to produce a viscous ester, incorporating a siccative oil into said ester in an amount between 1 part of siccative oil to 2/3 part ester and 1 part siccative oil to 9 parts ester by weight, and bodying the resulting mixture to a cementitious gel resistant to solvents, grease, oil, acids and alkalies.

5. A covering sheet for floors, walls, and other surfaces comprising a backing sheet provided with a surfacing layer of substantial thickness upon and bonded to one surface of the backing layer, said surfacing layer comprising the product produced by the process defined in claim 1.

6. A covering sheet for floors, walls, and other surfaces comprising a backing sheet provided with a surfacing layer of substantial thickness upon and bonded to one surface of the backing layer, said surfacing layer comprising the product produced by the process defined in claim 2.

7. A covering sheet for floors, walls, and other surfaces comprising a backing sheet provided with a surfacing layer of substantial thickness upon and bonded to one surface of the backing layer, said surfacing comprising the product produced by the process defined in claim 3.

8. A covering sheet for floors, walls, and other surfaces comprising a backing sheet provided with a surfacing layer of substantial thickness upon and bonded to one surface of the backing layer, said surfacing layer comprising the product produced by the process defined in claim 4.

WILLIAM ROWE.
SAMUEL A. COHEN.

REFERENCES CITED

The following references are of record in the file of this patent:

UNITED STATES PATENTS

| Number | Name | Date |
| --- | --- | --- |
| 2,317,487 | Schuelke | Apr. 27, 1943 |
| 2,439,377 | Bare et al. | Apr. 13, 1948 |